US010634545B2

(12) United States Patent
Boström

(10) Patent No.: US 10,634,545 B2
(45) Date of Patent: Apr. 28, 2020

(54) DEVICE FOR PROVIDING A GAS COMPOSITION AND TEMPERATURE COMPENSATED ACOUSTIC MEASUREMENT OF A LIQUID LEVEL

(71) Applicant: AXSENSOR AB, Göteborg (SE)

(72) Inventor: Jan Boström, Göteborg (SE)

(73) Assignee: AXSENSOR AB, Gothenburg (SE)

( * ) Notice: Subject to any disclaimer, the term of this patent is extended or adjusted under 35 U.S.C. 154(b) by 174 days.

(21) Appl. No.: 15/742,089

(22) PCT Filed: Jul. 6, 2016

(86) PCT No.: PCT/EP2016/066000
§ 371 (c)(1),
(2) Date: Jan. 5, 2018

(87) PCT Pub. No.: WO2017/005802
PCT Pub. Date: Jan. 12, 2017

(65) Prior Publication Data
US 2018/0202853 A1    Jul. 19, 2018

(30) Foreign Application Priority Data
Jul. 9, 2015   (EP) ..................................... 15175985

(51) Int. Cl.
| G01F 23/296 | (2006.01) |
| B60K 15/03 | (2006.01) |
| G01F 25/00 | (2006.01) |

(52) U.S. Cl.
CPC .......... *G01F 23/2962* (2013.01); *B60K 15/03* (2013.01); *G01F 23/2968* (2013.01);
(Continued)

(58) Field of Classification Search
CPC ............. G01F 23/2962; G01F 23/2968; G01F 23/2966; G01F 23/296; G01F 25/0061;
(Continued)

(56) References Cited

U.S. PATENT DOCUMENTS

| 5,471,872 A | 12/1995 | Cummings |
| 2007/0204689 A1 | 9/2007 | Boström |

(Continued)

FOREIGN PATENT DOCUMENTS

| EP | 1 676 102 B1 | 7/2006 |
| WO | WO 2005/038415 A1 | 4/2005 |

(Continued)

OTHER PUBLICATIONS

International Search Report (PCT/ISA/210) dated Oct. 14, 2016, by the European Patent Office as the International Searching Authority for International Application No. PCT/EP2016/066000.

(Continued)

*Primary Examiner* — Lisa M Caputo
*Assistant Examiner* — Nigel H Plumb
(74) *Attorney, Agent, or Firm* — Buchanan Ingersoll & Rooney P.C.

(57) ABSTRACT

A device for providing a gas and temperature compensated acoustic measurement of the level of a liquid surface, including a transmitter, a receiver, and a waveguide for guiding acoustic signals. The waveguide includes a reference portion extending from a first end to a reference element, and a measurement portion extending from the reference element towards the end. The device further includes a channel extending from at least one inlet in said reference portion to at least one outlet in said measurement portion, the channel being separated from the waveguide so as to provide a fluid flow independent of the waveguide, and (Continued)

a gas-pump arranged to create a gas flow in said channel from said at least one inlet to said at least one outlet.

17 Claims, 7 Drawing Sheets

(52) U.S. Cl.
CPC ............... *G01F 25/0061* (2013.01); *B60K 2015/03217* (2013.01); *G01F 23/2966* (2013.01)

(58) Field of Classification Search
CPC .. B60K 15/03; B60K 2015/03217; H04L 1/02
See application file for complete search history.

(56) References Cited

U.S. PATENT DOCUMENTS

| | | |
|---|---|---|
| 2009/0282911 A1 | 11/2009 | Boström |
| 2010/0212418 A1 | 8/2010 | Boström |
| 2015/0013452 A1 | 1/2015 | Bostrom |

FOREIGN PATENT DOCUMENTS

| | | |
|---|---|---|
| WO | WO 2008/008019 A1 | 1/2008 |
| WO | WO 2009/020424 A1 | 2/2009 |
| WO | WO 2015/004184 A1 | 1/2015 |

OTHER PUBLICATIONS

Written Opinion (PCT/ISA/237) dated Oct. 14, 2016, by the European Patent Office as the International Searching Authority for International Application No. PCT/EP2016/066000.

DEVICE FOR PROVIDING A GAS COMPOSITION AND TEMPERATURE COMPENSATED ACOUSTIC MEASUREMENT OF A LIQUID LEVEL

FIELD OF THE INVENTION

The present invention relates to a device for providing a compensated measurement of the level of a liquid in a tank.

BACKGROUND OF THE INVENTION

An example of a device for providing a compensated measurement of the level of a liquid in a tank is disclosed in the international patent application WO 2005/038415. The device in WO 2005/038415 comprises a transducer for transmitting and receiving acoustic signals, and a waveguide connected to the transducer and extending into the liquid. The liquid level is basically determined based on the speed of sound and the transit time of the acoustic signal from the transducer to a surface of the liquid (where it is reflected) and back to the transducer again. Since the speed of sound depends on gas composition and temperature which may vary from time to time, the current speed of sound is used in determining the liquid level, which current speed of sound in turn is determined by means of a reference system in the waveguide. Further, since the gas composition and temperature in the reference system may differ from the gas composition and temperature in the rest of the waveguide above the liquid, for instance if the liquid level is low, a fuel pump associated with the tank is used to feed a flow of fluid (namely fuel) originating from the tank into a portion of the waveguide which in use is located above the liquid. The flow of fuel levels the temperature and gas composition, and consequently the speed of sound, throughout the waveguide above the liquid, which in turn allows for a more accurate measurement of the liquid level.

However, the access to the fuel pump may be restricted and other solutions are thus also needed. For example, a solution using e.g. capillary forces is disclosed in the patent application WO 2015/0041848. The device in WO 2015/0041848 comprises an absorbing element which collects liquid in the tank by means of capillary attraction to release gas originating from the liquid in the tank to a retaining chamber and thereby a reference portion of the waveguide.

It has been seen that the known devices may adapt slowly to changes in composition of gas and/or temperature leading to a non-optimal levelling out effect of the speed of sound. The delay in levelling effect of the speed of sound implies an undesirable inaccuracy in the acoustic measurements by the devices. In particular, when the liquid level is low and the distance between the liquid level and e.g. a reference portion of the waveguide is large there remains a difficulty in providing a composition of gas and/or temperature in the reference portion which determines a speed of sound which is substantially equal to the speed of sound in a measurement portion of the waveguide.

Thus, there is still a need in the art to provide a device for providing a compensated acoustic measurement of the level of a liquid in a tank which allows for more accurate acoustic measurements.

SUMMARY OF THE INVENTION

It is an object of the present invention to at least partly overcome problems in the prior art, and to provide an improved liquid level measurement device, which in particular allows for more accurate acoustic measurements.

These and other objects that will become apparent from the following description are achieved by a measurement device according to the appended claims.

According to a first aspect of the invention, there is provided a device for providing a gas composition and temperature compensated acoustic measurement of the level of a liquid in a tank. The device comprises a transmitter adapted to transmit acoustic signals, a receiver adapted to receive reflections of the acoustic signals, a waveguide for guiding acoustic signals from the transmitter to the liquid surface and for guiding reflections of the acoustic signals back to the receiver. The waveguide comprises a first end connected to the transmitter, a second end adapted to extend into the liquid, a reference element arranged in the waveguide, a reference portion extending from the first end to the reference element, and a measurement portion extending from the reference element towards the second end. The device further comprises a channel extending from at least one inlet in the reference portion to at least one outlet in said measurement portion, this channel being separated from the waveguide so as to provide a fluid flow independent of the waveguide, and a gas-pump arranged to create, during operation, a gas flow in the channel from the at least one inlet to the at least one outlet.

The channel thus provides fluid connection (in addition to the waveguide itself) between the reference portion and the measurement portion, though which a gas pump creates a gas flow. It is noted that at least part of the channel may be arranged inside the waveguide, as long as it is separated from it. For example, the channel may be a pipe arranged inside the waveguide.

The invention is based on the realization that a fluid flow (primarily but not necessarily exclusively gas) from the reference portion of the waveguide to the measurement portion of the waveguide will serve to equalize the gas composition throughout the waveguide. As a result, the device according to the present invention provides an increased accuracy when performing acoustic measurements of a liquid level in a tank. The idea behind the invention thus differs in that many of the previous solutions have aimed at introducing a fluid, directly or indirectly, from the tank into the reference portion by different means, whereas the invention directs fluid (primarily gas) from the reference portion to the measurement portion. A difference in gas composition between the reference portion and the measurement portion is thus leveled out by creating a flow of fluid from the reference portion to the measurement portion.

An advantage with the invention is that accurate measurements are enabled even when the liquid level is low and/or the distance between the liquid level and the reference portion is large. Hence, it should be understood that a larger distance may introduce larger measurement errors. In other words, if there is a slightly different gas composition in the reference portion compared to the measurement portion, the difference between the correct distance and the measured distance increases with an increasing distance to measure. A large distance should in these circumstances be interpreted as larger than 50 mm, or larger than 100 mm, or even larger than 200 mm.

It should of course be noted that the system may be seen as a loop such that the flow of fluid entering the measurement portion forces the gas, and thus gas composition of the measurement portion to enter and mix with the gas composition of the reference portion. In other words, the gas pump also causes a circulation of the gas from the measurement portion to the reference portion.

Fluid in this case may refer both to gas or liquid. The invention is based on the concepts of transferring the gas composition of the reference portion to the measurement portion, or transferring the reason(s) for a different gas composition from the reference portion to the measurement portion such as a liquid which evaporates. Hence, it is also advantageous to also transport any liquid within the reference portion away from the reference portions as a liquid therein may be disadvantageous to the reference measurements performed therein. A liquid may be present in the reference portion due to e.g. condensation.

It should be noted that in order to determine the level of the liquid the device may further comprise processing circuitry connected to the transmitter and the receiver and adapted to determine the level of the liquid based on the transmitted acoustic signals and the received reflections of the acoustic signals. Alternatively, the information regarding the transmitted acoustic signals and the received reflections of the acoustic signals is sent to remote processing circuitry, i.e. being separate and not part of the device, via known means of communication such as wired or wireless communication.

In at least one exemplary embodiment, the pump comprises a piezoelectric element. Hence, the pump may be known as a piezoelectric pump.

In at least one exemplary embodiment, the device comprises a plurality of inlets arranged along the longitudinal extension of the reference portion, the plurality of inlets being connected to the at least one outlet via the channel. In order to provide mixture of the gas composition present along the longitudinal extension of the reference portion, or in order to reduce the size of the at least one inlet, a plurality of inlets may advantageously be used. The plurality of inlets may be spaced apart either regularly or in a random manner along the longitudinal extension of the reference portion. Another advantage of providing a plurality of inlets is that even if one inlet becomes clogged, the flow of fluid from the reference portion to the measurement portion may still be provided.

In at least one exemplary embodiment, the device comprises a plurality of separate outlets spaced apart and arranged along the longitudinal extension of the measurement portion. For example, the device may further comprise an inner pipe arranged along the longitudinal extension of the measurement portion of the waveguide. The inner pipe may be either a separate part or formed integral to the walls of the waveguide. The plurality of separate outlets spaced apart and arranged along the longitudinal extension of the measurement portion may be plurality of through-going holes in the wall of the inner pipe to the measurement portion of the waveguide. The plurality of through-going holes allows the flow of fluid originating from the reference portion to enter the measurement portion. By having a plurality of separate through-going holes the size of each one of the plurality of outlets may be reduced. An additional advantage with the direction of the flow should hereby be noted, during operation, the fluid is pushed out through the plurality of outlets which thereby reduce the risk for the outlets to be clogged by particles or contaminants in the liquid, as the fluid from the reference portion is typically gas.

In at least one exemplary embodiment, the channel extends along the measurement portion, and said at least one outlet is a slit in the channel between the channel and the measurement portion. The slit is arranged to release the flow of fluid along the longitudinal extension of the measurement portion. Hereby, the gas composition along the longitudinal extension of the measurement portion may become substantially similar.

In at least one exemplary embodiment, a size of each outlet of the plurality of outlets, or a width of the slit is configured such that the release of gas is substantially uniform along the longitudinal extension of the measurement portion. For example, the plurality of outlets may have an increasing size or diameter towards the second end such that the flow of fluid out from the outlets arranged closer to the second end does not decrease. This may be advantageous as the surface of the liquid may often be closer to the second end, e.g. a tank is oftentimes not full, and gas evaporating from surface of the liquid introduces a different gas composition.

For example, the device may further comprise an inner pipe connected to the channel, the inner pipe arranged along the longitudinal extension of the measurement portion of the waveguide. The inner pipe may be either a separate part or formed integral to the walls of the waveguide. The at least one outlet arranged to release the flow of fluid along the longitudinal extension of the measurement portion may thus comprise a thin slit running along the length of the inner pipe, i.e. the longitudinal extension of the measurement portion. The width of the slit may be configured such that the release of gas is substantially uniform along the longitudinal extensions of the measurement portion. For example, the width of the slit may increase towards the second end In at least one exemplary embodiment, a single outlet may be arranged at a lower end of an inner pipe arranged at least partly in said measurement portion, such that bubbles may form when the surface of the liquid is above the single outlet. Alternatively, the plurality of outlets may be configured such that at least one outlet, during operation, may be arranged below the surface the liquid and thus produces bubbles. Bubbles do not interfere with the level measurement. However, bubbles may increase the evaporation and thus improve the circulation of gas within the waveguide.

In at least one exemplary embodiment, the at least one outlet is configured to provide a stream of fluid in a downwards direction along the longitudinal extension of said measurement portion, such that when the surface is beneath the at least outlet, the at least one outlet creates a jet of fluid which at least partly reaches the surface of the liquid. The at least one outlet may thus be understood as being arranged above the surface of the liquid during normal operating conditions, and provides a jet of fluid which at least partly reaches the surface. By reaching the surface of the level to be measured it should be understood that the stream provided from the outlet may have a sufficient velocity to travel along the longitudinal extension of the measurement portion to reach the surface. The gas composition may be denser closer to the surface, for example cause by evaporation of the liquid in the tank. Enabling the stream of fluid to reach the surface may thus improve the mixing of the gas composition within the waveguide.

In at least one exemplary embodiment, the at least one outlet is arranged to direct the flow of fluid in a direction at least partly tangential to an inner wall of the measurement portion of the waveguide such that a helical flow is obtained in at least a part of the measurement portion. A helical flow may provide an improved mixture of the fluid, e.g. gas, within the measurement portion and thereby reduce the occurrence of local differences in the gas composition in the waveguide.

In at least one exemplary embodiment, at least a portion of an inner wall of the waveguide forms a spiral track along the inner wall of the measurement portion. The spiral track may redirect the flow from an outlet into a helical flow. For example, the spiral track may be used together with the least one outlet which is arranged to direct the flow of fluid in a direction at least partly tangential to an inner wall of the measurement portion of the waveguide. Thereby, the helical flow may be provided in a larger portion of the measurement portion.

In at least one exemplary embodiment, the device further comprises an absorbing element arranged in a retaining chamber in fluid connection with the reference portion, the absorbing element being adapted to collect liquid originating from the liquid in the tank and to release gas originating from the liquid. The absorbing element may be the same absorbing element as described in WO 2015/0041848 and comprise the same materials and functionality as therein described. Hence, the absorbing element may have a portion adapted to extend into the liquid in the tank and to collect the liquid by means of capillary attraction. The absorbing element is arranged in fluid connection with the reference portion such that the release of gas may influence the gas composition within the reference portion. A portion of the absorbing element being adapted to extend into the liquid in the tank and to collect the liquid by means of capillary attraction may extend through the waveguide.

In at least one exemplary embodiment, the transmitter and the receiver are integrated into a single acoustic transducer. Space is thus saved, and the liquid level measurement may be made smaller. Further, a single acoustic transducer allows the transmitting and receiving function to share electrical wires and/or other components. For example, the transmitter and receiver may share the acoustic transducer element, e.g. a double-acting piezoelectric element.

In at least one exemplary embodiment, the transmitter is driven by a first drive frequency and the pump is driven by a second drive frequency. A first and second frequency should herein and henceforth be understood as two separated frequencies, or frequency ranges. The first and second frequencies, or first and second frequency ranges, are separated such that there is no overlap and the measurement provided by the first frequency can be distinguished from the pumping at the second frequency.

The drive frequencies may be related to different resonance modes of a membrane of the transmitter and pump respectively, such that the transmitter and pump are activated only by the corresponding resonance frequency.

This enables connection of the pump and the transmitter by a single shared signal wire, wherein a frequency of a control signal on the shared signal wire determines which one of the pump and transmitter that is operable. In other words, a control signal having a first frequency will activate the transducer, while a control signal having a second signal will activate the pump. Optionally, the single shared signal wire is also connected to the receiver. It is desirable to reduce the amount of wires which penetrate through the walls of the tank in which a liquid level measurement device may be arranged. In other words, number of openings, or the size of the opening(s), through the tank walls may be reduced by connecting the pump, the transmitter and possibly the receiver such that they share a single signal wire.

In at least one exemplary embodiment, the first frequency and the second frequency are sent, during operation, in an alternating manner on a single shared signal wire. Hence, the signals sent, during operation, on a single shared signal wire may comprise both frequencies, e.g. being time-shared such that the first frequency is sent during a first time period, and the second frequency is sent during a second time period, the first and second frequency are subsequently sent in an alternating manner.

In one possible embodiment, the gas-pump is formed by said transmitter (i.e. the transmitter is adapted to operate also as a pump). Thereby, it may be possible to use the same piezoelectric element for the acoustic transducer function as for the pump function, potentially making the level measurement device more compact and/or less expensive. Activation by different drive frequencies, associated with different resonance modes is especially advantageous in this embodiment.

In at least one exemplary embodiment, the gas pump may instead create a flow of fluid from the measurement portion to the reference portion, i.e. the direction of the flow created by the gas-pump may be reversed. Although such an embodiment is covered by the invention made by the inventor in European patent 1676102, the present invention offers an alternative solution with different alternative details. This embodiment is of course combinable with the embodiments described previously and hereinafter.

Generally, all terms used in the description or claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements.

DETAILED DESCRIPTION

In the present detailed description, embodiments of a liquid level measurement device according to the present invention are mainly discussed with reference to views showing a liquid level measurement device according to various embodiments of the invention. It should be noted that this by no means limits the scope of the invention, which is also applicable in other circumstances for instance with other types or variants of waveguides, pumps, and outlets than the embodiments shown in the appended drawings. Further, that specific features are mentioned in connection to an embodiment of the invention does not mean that those components cannot be used to an advantage together with other embodiments of the invention.

The device according to the present invention is suitable for providing a gas composition and temperature compensated acoustic measurement of the level of a liquid in a tank. When fluid originating from the liquid (especially gasoline or petrol in case the tank is a fuel tank) in the tank evaporates into the waveguide of the device, it is important to level out the differences in gas composition and temperature as quick as possible in order to not disturb the acoustic measurements of the liquid level in the tank.

In a device according to the present invention, the device comprises means for feeding a flow of fluid originating from the reference portion of the waveguide into the measurement portion of the waveguide. The difference in gas composition between the reference portion and the measurement portion is thus leveled out by creating a flow of fluid, e.g. gas, from the reference portion to the measurement portion. It should of course be noted that the system may be seen as a closed loop, such that the flow of fluid entering the measurement portion will force the gas, and thus gas composition of the measurement portion to enter and mix with the gas composition of the references portion. In other words, the means for feeding a flow of fluid originating from the reference portion of the waveguide into the measurement portion of the waveguide also causes a circulation or the gas from the measurement portions to the reference portion.

The at least one inlet and the at least one outlets discussed below are preferably small in cross-sectional dimension compared to the cross-sectional dimension of the waveguide, since they thereby does not influence, or have a minimal influence, the acoustic signals and reflections of acoustic signals travelling throughout the waveguide.

Figure 1:
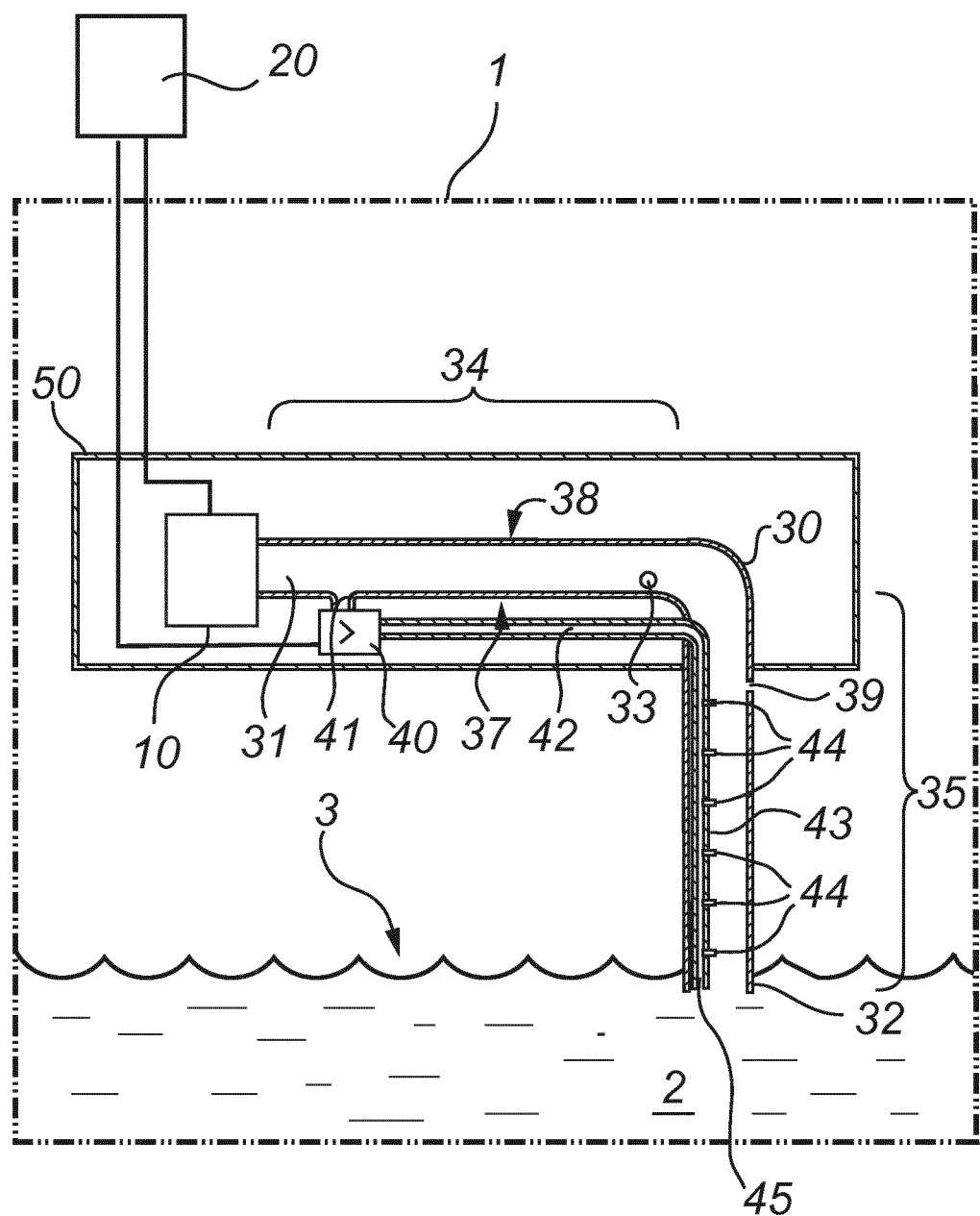
FIG. 1 schematically shows an at least partly cross-sectional side view of a device according to one embodiment of the invention.

FIG. 1 illustrates a liquid level measurement device arranged in a tank 1 according to a first embodiment of the present invention. The liquid level measurement device is a device for providing a gas composition and temperature compensated acoustic measurement of the liquid in the tank. The tank 1 may for instance be a fuel tank for a vehicle, such as a car, a truck, a bus, or a boat.

The liquid level measurement device comprises a transducer 10, a processing circuitry 20, a pump 40 and an enclosure 50. The transducer 10 and pump are arranged within the enclosure 50. The waveguide 30 is at least partly arranged within the enclosure 50. In FIG. 1 the processing circuitry 20 is arranged outside the enclosure 50. Alternatively, the processing circuitry 20 may be arranged inside the enclosure 50. As another alternative, the pump 40 may be arranged outside the enclosure 50.

It should of course be noted that although the processing circuitry 20 is henceforth described as being part of the liquid level measurement device, the processing circuitry may instead be remotely arranged and the activation and control of the acoustic transducer 10 and the pump 40 may be performed by circuitry arranged within those components.

The transducer 10 is adapted to transmit acoustic signals and to receive reflections of the acoustic signals. The transducer 10 may be an electro-acoustic transducer generally adapted to convert electrical signals to acoustic signals or sound pulses, and vice versa. For example, the frequency may be a frequency allowing for plane wave propagation. Plane wave propagation is typically dependent on both the frequency and the diameter of the waveguide. The transducer 10 may for instance comprise a double-acting piezoelectric component. The transducer 10 may comprise a separate sound transmitter and sound receiver.

In FIG. 1, the transducer 10 is placed inside the tank 1, more particularly, in the upper part of the tank above the liquid level surface 3. Alternatively, the transducer 10 may be placed outside the tank 1.

The processing circuitry 20 is connected to the transducer 10 for supplying electrical signals thereto and to evaluate electrical signals therefrom. The processing circuitry 20 is adapted to determine the level of the liquid based on the transmitted acoustic signals and the received reflections of the acoustic signals. The processing circuitry 20 may comprise integrated circuits, AD-circuitry, frequency filters and the like in order determine the level of the liquid in the tank 1. It is of course also possible and within the scope that at least parts or all the functionality of the processing circuitry 20 is incorporated in software. The processing circuitry 20 may thus comprise a processor and memory for storing instruction thereon. The memory may be a non-transitory memory.

In FIG. 1, the processing circuitry 20 is arranged outside the tank 1. Alternatively, the processing circuit 20 may be arranged inside the tank, and optionally integrated with the transducer 10.

The waveguide 30 is generally adapted to guide acoustic signals from the transducer 10 to the liquid level surface 3 and for guiding reflections of the acoustic signals back to the transducer. The waveguide 30 may for instance be a tube or a pipe in which acoustic signals can be guided.

The waveguide comprises a first end 31 and a second end 32. The first end 31 is connected to the transducer 10 to guide the acoustic signals to and from the transducer 10. The second end 32 is adapted to be extended or submersed into the liquid 2 in the tank 1, such that the acoustic signals may be reflected by the liquid level surface 3 during operation.

The waveguide 30 further comprises a reference element 33 being located between the first end and the second end. The reference element 33 is preferably arranged at a known distance from the transducer 10 above a predetermined point in the waveguide 30 up to which liquid generally is allowed to reach. Thus, the reference element 33 is generally located above the liquid level surface 3 during operation.

The reference element 33 is able to reflect acoustic signals, thereby providing a reference reflection allowing the processing circuitry 20 to determine a reference speed of sound in a reference portion 34 extending between the first end 31 and the reference element 33.

The reference element 33 may for instance be a small protrusion, such as a pin or a tap or a ring, adapted to partly reflect an acoustic signal travelling in the waveguide 30 in the direction from the first end 31 towards the second end 32. Alternatively, the reference element 33 may be a change in cross-sectional area, e.g. of the waveguide.

The waveguide may further comprise a second reference element (not shown in FIG. 1) similar to the first reference element 33, thereby providing a second reference reflection allowing said processing circuitry 20 to determine a second reference speed of sound in a second reference portion extending between said first end 31 and said second reference element. The second reference element being located between the reference element 33 and the second end 32.

The device may comprise additional reference elements, which may be used in analogy with the first reference element 33 and the second reference element, respectively.

The reference portion 34 of the waveguide, i.e. the portion extending between the first end 31 and the reference element 33 comprises a bottom surface 37 intended to face the liquid level surface 3 during operation, and a top surface 38 intended to face away from the liquid level surface 3 during operation. At least one inlet, herein a single inlet 41 is shown, for feeding fluid from the from the reference portion 34 to the pump 40. The inlet 41 is arranged at the bottom surface 37. Alternatively, the inlet may be arranged on the top surface 38, or on a sidewall (not shown) of the reference portion 34.

At least a part of the reference portion 34 may have a helical or flat spiral shape (not shown in FIG. 1) in order to save space, as shown in the international patent application publication no. WO 2009/020424. At least a part of the reference portion 34 may be placed outside the tank 1 (not shown).

The reference portion 34 is typically arranged in the waveguide for guiding acoustic signals from the transmitter, i.e. acoustic transducer 10, to the liquid level surface and for guiding reflections of the acoustic signals back to the receiver, i.e. acoustic transducer 10. However, the reference portion 34 may alternatively be arranged in a separate waveguide used as an external reference system.

The pump 40 is arranged within the enclosure 50, and is in fluid connection with the inlet 41. A channel 42 extends from the pump 40 to a plurality of outlets 44 arranged in the measurement portion 35. Alternatively, the channel 42 may extend from the inlet 41 to the pump 40 as well. The channel 42 thus creates a fluid connection between the reference portion 34 and the measurement portion 35. When the pump 40 is operated, fluid is drawn from the reference portion 34 and pushed out in the measurement portion 35 via the outlets 44. The pump 40 is connected to the processing circuitry 20 which, in use, operates the pump 40. The pump 40 may comprise a piezoelectric element to provide the pumping action. The pump may thus be known as a piezoelectric pump.

The channel 42 is connected to a pipe 43 arranged in the measurement portion 35. The pipe may be known as an inner pipe 43. The inner pipe 43 may be a separate part, thereby allowing for the inner pipe 43 to be inserted into the waveguide 30 during assembly of the device. Alternatively, the inner pipe 43 may be formed integral to the walls of the waveguide, e.g. extruded as a portion of the waveguide 30.

In FIG. 1, the plurality of outlets 44 are through-going holes in the wall of the inner pipe 43. It is important to note that, during operation, the fluid is ejected out through the outlets 44 which thereby reduce the risk for the outlets 44 to be clogged by particles or contaminants in the liquid 2. Note that the plurality of separate outlets 44 are spaced apart and arranged along the longitudinal extension of the measurement portion 35. Each outlet of the plurality of outlets 44 may have a size or diameter configured such that the release of the flow of fluid into the measurement portion 35 is substantially uniform along the longitudinal extension of the measurement portion 35. For example, the outlets 44 may have an increasing diameter towards the second end 32 such that the flow of fluid out from the plurality of outlets 44 does not decrease towards the second end 32.

Also shown in FIG. 1 is a single outlet 45 arranged at the lower end of the inner pipe 43. The single outlet 45 is preferably arranged beneath the surface 3 of the liquid during operation, and may therefore cause bubbles to form. Alternatively, one or more of the outlets 44 may be arranged and configured such that one or more outlet is arranged below the surface 3 of the liquid 2 during operation, and may therefore cause bubbles to form. Thus, the possible combinations are that the inner pipe 43 in different embodiments comprises only the single outlet 45, the single outlet 45 and the plurality of outlets 44, or only the plurality of outlets 44.

The enclosure 50 has an opening for the waveguide 30 to extend into the tank. The opening for the waveguide 30 may seal any gap between the enclosure 50 and the waveguide. Therefore, the waveguide 30 has a venting opening 39 close to the enclosure 50, in order to ventilate and pressure equalize within the waveguide as the surface 3 of the liquid 2 rises and falls. The venting opening 39 and enclosure 50 enables the enclosure to function as a diving bell if the enclosure 50 becomes submerged by the liquid 2. Therefore, the venting opening 39 is arranged close to the enclosure 50. The venting opening 39 allows the surface 3 of the liquid to rise within the waveguide 30 until it reaches the venting opening 39, after which the enclosure 50 may function as a diving bell. Thereby, there is less risk that liquid fills a portion the enclosure 50 which is undesirable as the measurements may become inaccurate if there is liquid in the enclosure 50, in particular in the reference portion 34.

In an alternative embodiment (not shown), the enclosure 50 may also comprise a venting opening. Alternatively, both the waveguide 30 and the enclosure 50 may comprise venting opening arranged close to each other to allow the enclosure to function as a diving bell.

An exemplary operation of the liquid level measurement device shown in FIG. 1 will now be described firstly with reference to the measurement cycle using the acoustic transducer 10, and secondly with reference to the pump 40.

Firstly, an electrical signal or pulse is provided by the processing circuitry 20 to the acoustic transducer 10 causing the acoustic transducer 10 to transmit a corresponding acoustic signal or sound pulse. The transmitted acoustic signal is guided by the waveguide 30 along a reference portion 34 towards the liquid level surface 3. A fraction of the acoustic signals is reflected back towards the acoustic transducer 10 by the reference element 33 via the reference portion 34 of the waveguide 30. Another fraction of the acoustic signals is reflected back towards the transducer 10 by the liquid level surface 3 via the waveguide 30. In response to the two reflected fractions of acoustic signals, the acoustic transducer 10 generates corresponding electric signals to be processed by the processing circuitry 20.

The processing circuitry 20 firstly uses the transit time for the fraction of acoustic signals reflected by the reference element 33 together with the known distance between the transducer 10 and the reference element 33 to calculate a reference speed of sound. The processing circuitry 20 then calculates the level of liquid 2 in the tank 1 based on the reference speed of sound and the transit time for the fraction of signals reflected by the liquid level surface 3. Also a second reference speed may be calculated and used in the level measurement.

During the measurement cycle the pump 40 is operated continuously or intermittently by the processing circuitry 20 which sends electrical signals or pulses to operate the pump 40. Alternatively, the pump 40 is not operated during the measurement cycle but continuously or intermittently at periods of time while the measurement is inactive. Thereby, the amount of peak power which needs to be supplied to the device may be reduced. Note that the acoustic transducer 10 and the pump are connected by separate electrical wiring in FIG. 1.

The operation of the pump 40 cause the fluid, e.g. the gas, in the reference portion 34 to be drawn through the inlet 41, the pump 40 and pushed through the channel 42 and into the inner pipe 43. At the inner pipe 43 the fluid is ejected from the plurality of outlets 44 into the measurement portion 35. The fluid, e.g. the gas, in the measurement portion 35 is thus displaced, and at least a portion of the fluid is transported to the reference portion 34. Hence, the inlet 41, the pump 40, and the outlets 44 achieve a circulation of the fluid from the reference portion 34 to the measurement portion 35. Thereby, the differences in the gas composition between the reference portion 34 and the measurement portion 35 may be reduced or minimized.

Figure 2:
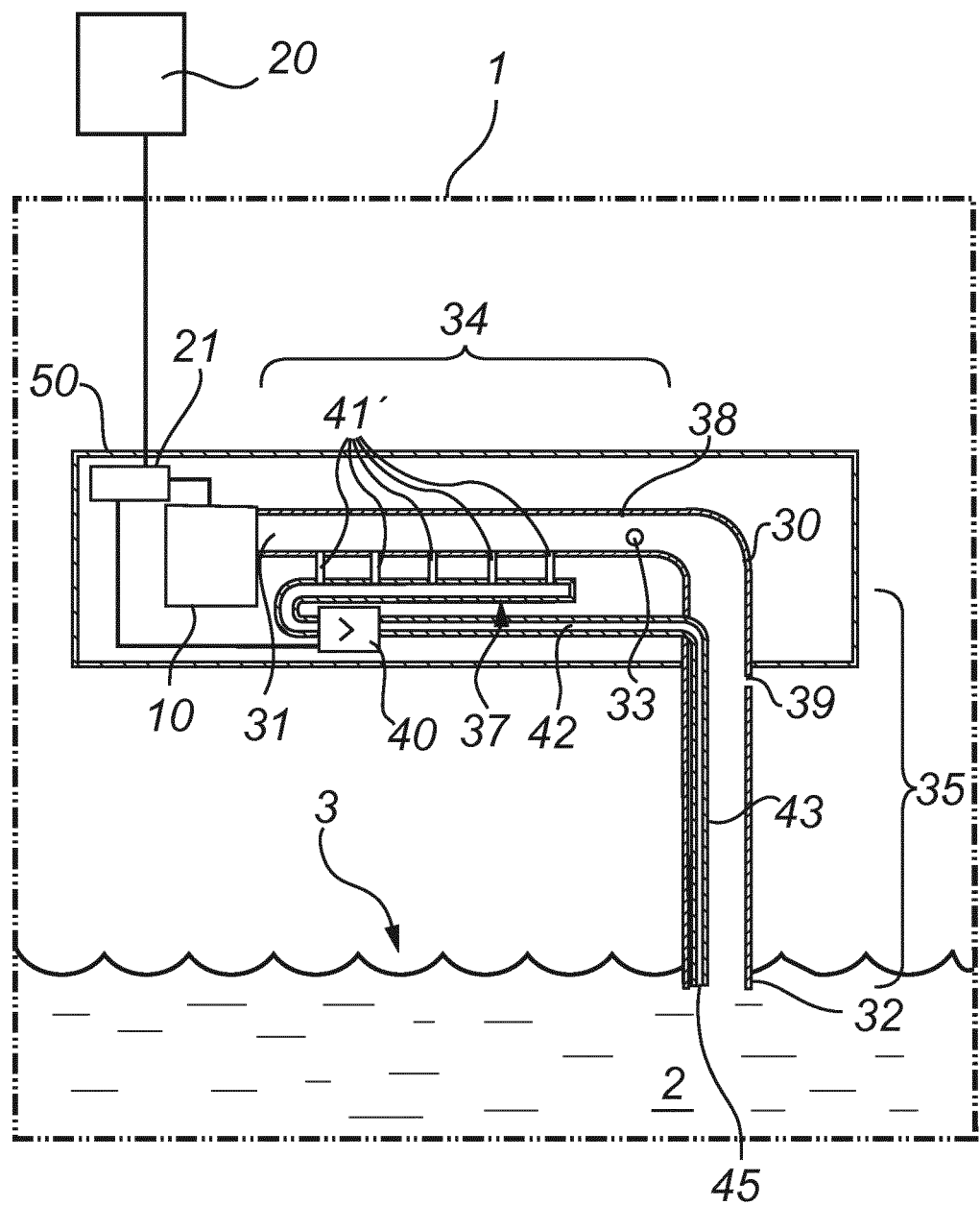
FIG. 2 schematically shows an at least partly cross-sectional side view of a device according to another embodiment of the invention.

FIG. 2 shows a liquid level measurement device according to another embodiment of the invention. As noted above, the same reference numerals refer to the same or similar elements. Only the key differences to the liquid level measurement device shown in FIG. 1 will now be described.

In FIG. 2, the liquid level measurement device comprises a plurality of inlets 41' arranged in the reference portion 34. The plurality of inlets 41' are arranged spaced apart regularly along the longitudinal extension of the reference portion 34. Alternatively, the plurality of inlets 41' may be spaced apart randomly along the longitudinal extension of the reference portion 34. The plurality of inlets 41' provides a mixture of the gas composition present along the longitudinal extension of the reference portion. Further, the size of each inlet may be reduced by using a plurality of inlets 41'. The plurality of inlets 41' also allows the flow of fluid from the reference portion 34 to the measurement portion 35 to be provided even if one, or several, of the plurality of inlets 41' becomes clogged.

Further, the acoustic transducer 10 and the pump 40 are connected by a single shared signal wire from the processing circuitry 20. The liquid level measurement device here comprises an electrical component 21 for directing the electrical power to the acoustic transducer 10 or the pump 40. For example, the transmitter of the acoustic transducer 10 may be driven by a first frequency and the pump may be driven by a second frequency. Therefore, the component 21 may be one or more electrical filter(s) to separate control signals having different frequencies.

Another option is that the transducer 10 and the pump 40 are activated by different drive frequencies. In this case, the component 21 may simply be an electrical connection for splitting the shared signal wire to the acoustic transducer 10 and the pump 40. One single control signal may be connected directly to the transducer 10 and pump 40, and the frequency of the control signal will determine which one of the transducer and pump that is activated. The drive frequencies of the transducer and pump may be associated with different resonance modes of a membrane in the transducer and pump, respectively. As an example, the drive frequency of the pump may be two or three times greater than the drive frequency of the transducer. The frequencies are typically in the order of tens of kHz.

The first and the second drive frequency may be sent in an alternating manner on the single shared signal wire. Hence, the signals sent on the single shared signal wire may comprise both frequencies, e.g. being time-shared such that the first frequency is sent during a first time period, and the second frequency is sent during a second time period, the first and second frequency are subsequently sent in an alternating manner. In other words, the acoustic transducer 10 is activated by a first drive frequency during a first time period, and then the pump 40 is activated by a second drive frequency during a second time period. As mentioned, the pump may be configured to only respond to the second frequency, and the transmitter is configured to only respond to the first frequency. However, it is of course possible that the pump 40 is activated to a small degree by the first frequency, although such a small degree does not disturb the measurements.

Figure 3A:
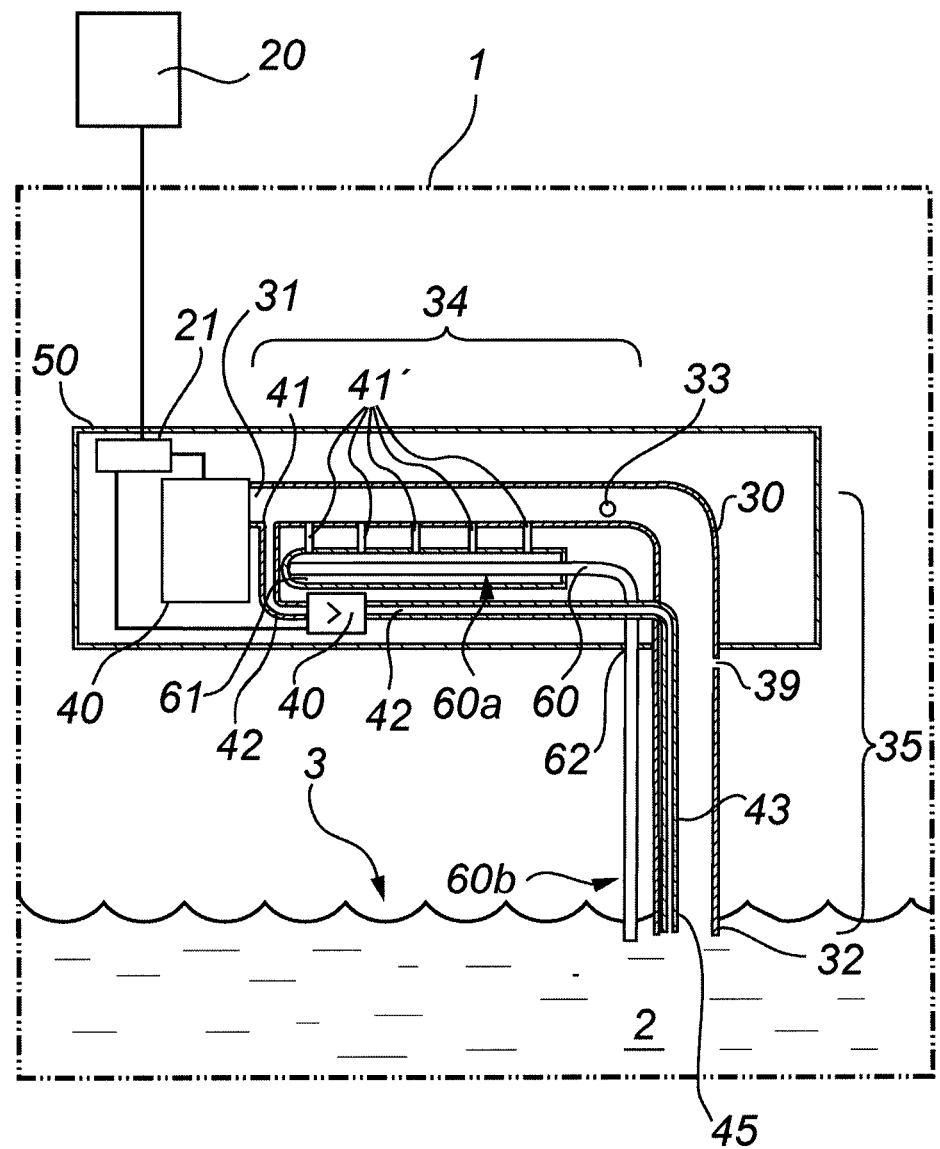
FIG. 3a schematically shows an at least partly cross-sectional side view of a device according to another embodiment of the invention.

FIG. 3*a* shows a liquid level measurement device according to another embodiment of the invention. As noted above, the same reference numerals refer to the same or similar elements. Only the key differences to the liquid level measurement devices shown in 2 will now be described.

The liquid level measurement device in FIG. 3 further comprises an absorbing element 60 and a retaining chamber 61 for the absorbing element 60. The retaining chamber 61 is in fluid connection with the reference portion 34 via the inlets 41'. The absorbing element 60 is adapted to collect liquid originating from the tank and to release gas originating from said liquid. The liquid is collected by means of capillary attraction. The retaining chamber 61 at least temporarily retains liquid in the device during operation. The liquid is preferably retained in the absorbing element 60 close to the inlets 41', such that the inlets 41' may serve as a fluid connection between the retaining chamber 61 and the reference portion 34 during operation. During operation, the retained liquid may slowly evaporate.

The pump 40 is connected to the reference portion by the single inlet 41, and further connected to the measurement portion 35 via the channel 42 and the outlet 45.

As shown in FIG. 3*a*, the absorbing element 60 has a portion 60*a* arranged inside the retaining chamber 61. The absorbing element 60 may be a piece of liquid absorbing material such as a spongy material, a porous material, a felt, or the like. The absorbing element 60 is adapted to collect liquid originating from the liquid in the tank and to release gas originating from said liquid. The absorbing element 60 further has a portion 60*b* adapted to extend into the liquid 2 in the tank 1. The absorbing element 60 may collect liquid originating from the liquid in the tank and transport gas originating from the liquid into the waveguide 30, in particular into the reference portion 34, by means of capillary attraction. The absorbing element 60 passes through the opening 62 in the enclosure 50 into the retaining chamber 61. The opening 62 is preferably arranged close to the opening for the waveguide 30, such that the enclosure 50 may function as a diving bell if submerged in the liquid 2.

Alternatively, the retaining chamber 61 may comprise at least one tube (not shown) which is adapted to extend in to the liquid in the tank. The at least one tube may be narrow enough to collect liquid originating from the liquid in the tank and transport gas originating from the liquid into the waveguide by means of capillary attraction.

The liquid collected e.g. by the absorbing element 60 or by the at least one tube may optionally be pre-collected in an open container (not shown) arranged e.g. at the bottom of the tank. Typically, the open container has a smaller diameter than the tank. The open container may, for instance, be a container comprising a fuel pump. The open container comprising the fuel pump typically has a height within the range of from 5 cm to 15 cm. The open container is typically continuously filled with fuel, such as actively by the fuel pump or passively by an additional absorbing element being at least partly arranged in the open container. For instance, the additional absorbing element may be arranged with a first end portion inside the open container arranged in a first half of a saddle tank and with a second end in a second half of the saddle tank, wherein the second half of the saddle tank typically comprises more liquid than the first half of the saddle tank. If the second half of the saddle tank comprises an additional open container comprising a pump, the second end of the absorbing material may be arranged in the additional open container.

An arrangement including such an open container may be advantageous when the level of liquid is very low in the tank, but gas originating from the liquid in the tank is still needed in order to successfully level out the gas composition and the temperature throughout waveguide above the liquid level surface in order to obtain accurate acoustic measurements.

Figure 3B:
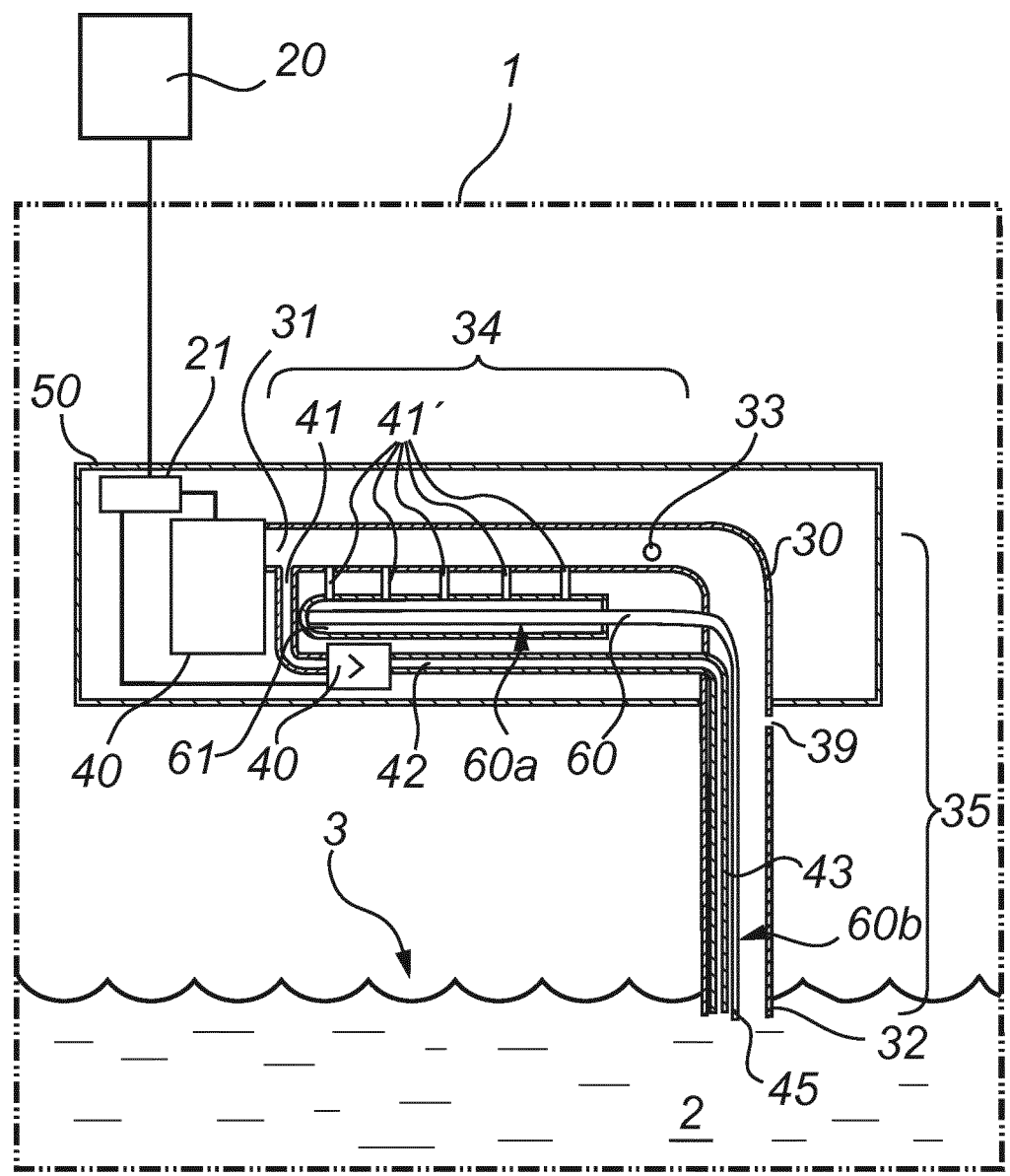
FIG. 3b schematically shows an at least partly cross-sectional side view of a device according to another embodiment of the invention.

FIG. 3b shows a liquid level measurement device according to another embodiment of the invention. The liquid level measurement device is similar to the device shown in FIG. 3a. The difference being that the portion 60b adapted to extend into the liquid 2 in the tank 1 extends inside the waveguide 30, i.e. the measurement portion 35. Thereby, there is no need to provide an additional opening, e.g. the opening 62 in FIG. 3a.

Figure 4:
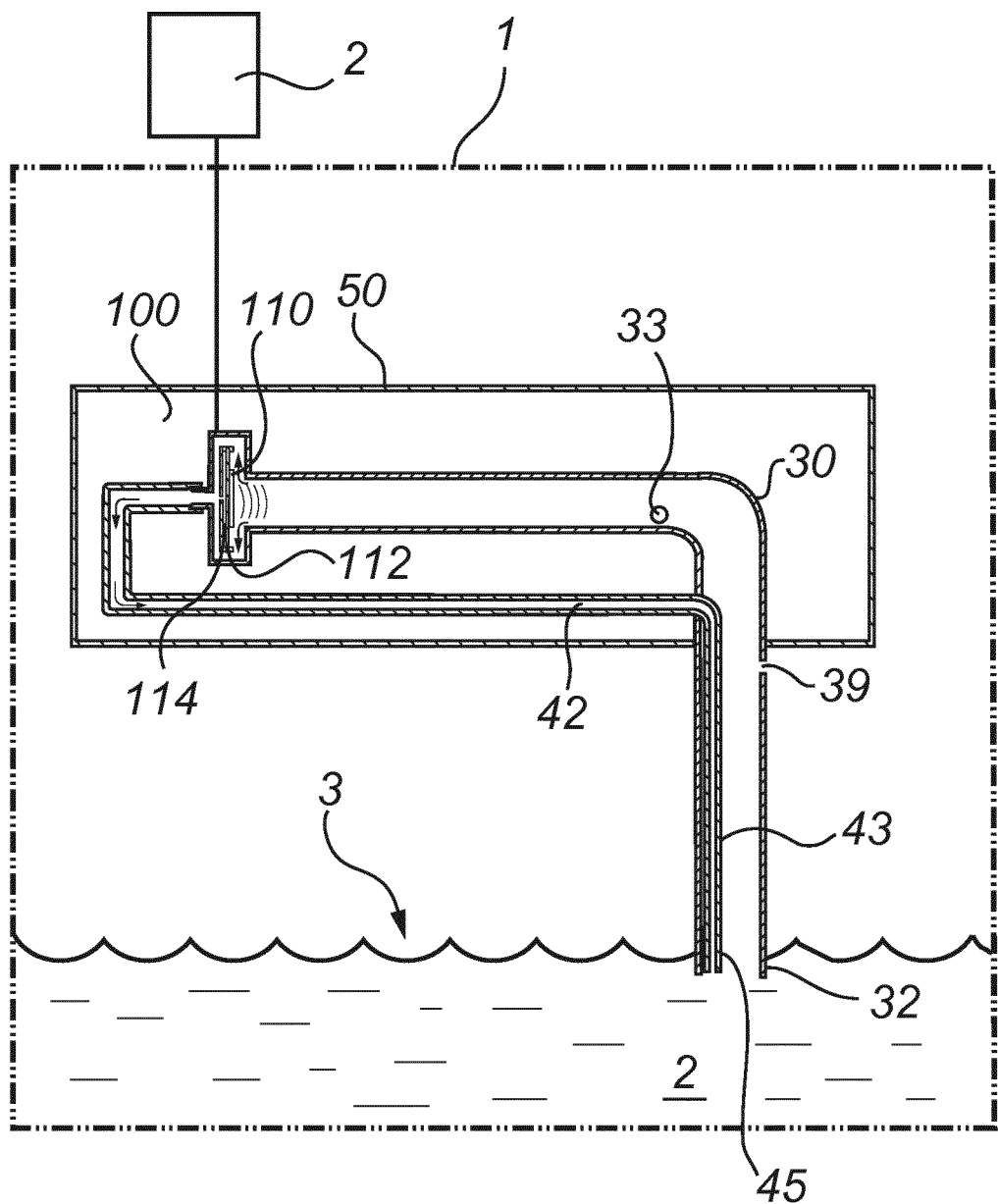
FIG. 4 schematically shows an at least partly cross-sectional side view of a device according to another embodiment of the invention.

FIG. 4 shows a liquid level measurement device according to another embodiment of the invention. As noted above, the same reference numerals refer to the same or similar elements. Only the key difference between the embodiments will now be described.

In the embodiment shown in FIG. 4 the pump and the acoustic transducer are integrated in one and the same unit 100. A double-acting piezoelectric element 110 is arranged in the unit and connected to a pump membrane 112. When operated at a first drive frequency (or first frequency range), corresponding to a first resonance mode, the membrane will act as a transmitter of acoustic waves, and when operated at a second drive frequency (or second frequency range), corresponding to a second resonance mode, the membrane will act as a gas-pump. The drive frequencies are typically in the order of tens of kHz. The second drive frequency may be about twice or three times as high as the first drive frequency.

More specifically, when the piezoelectric element 110 is vibrated at the second drive frequency, the membrane 112 causes air in a pump chamber 114 to be pushed out into an outlet of the unit 100 which is fluidly connected to the inner pipe 43. The unit 100 is connected to the first end 31 of the waveguide 30 which enables the pumping action of the unit 100 to draw air from the reference portion 34 to the measurement portion 35 as indicated by the arrows in FIG. 4.

When the piezoelectric element 110 is vibrated at the first drive frequency, the membrane 112 creates acoustic waves, indicated by the arced waves in FIG. 4, which are used to measure the distance in the same manner as described above in connection with FIG. 1.

FIG. 5a-e shows schematic views of different design of an outlet, the channel and parts of the measurement portions. As noted above, the same reference numerals refer to the same or similar elements. Only the key difference between the embodiments will now be described.

Figure 5A:
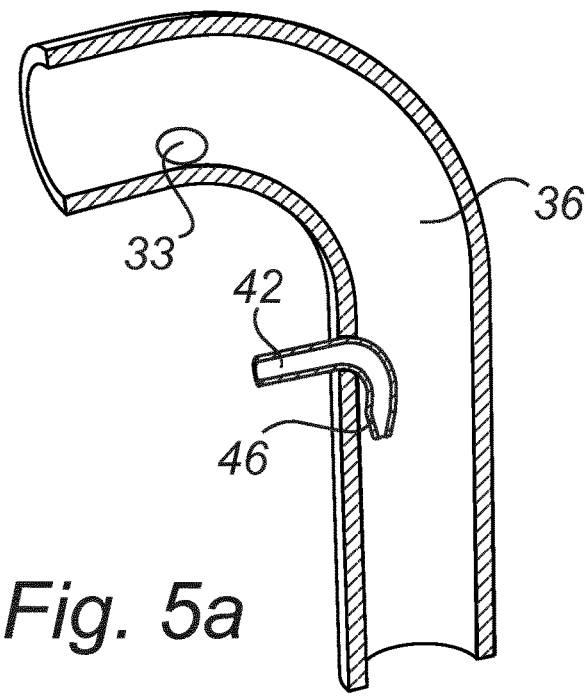
FIG. 5a-e shows at least partly cross-sectional perspective views of waveguides and outlets which may be used with the liquid level measurement device according to any of the previous embodiments.

FIG. 5a shows an outlet 46 which is arranged such that is, during operation, is above the surface level of the liquid. The outlet 46 is configured to provide a stream of fluid such that it reaches the surface of the liquid level to be measured. The outlet 46 has a tapered shape in order to provide an increase pressure for the fluid at the outlet 46, such that the velocity of the fluid streaming out of the outlet may increase and thereby achieve sufficient velocity to reach the surface of the liquid.

Figure 5B:
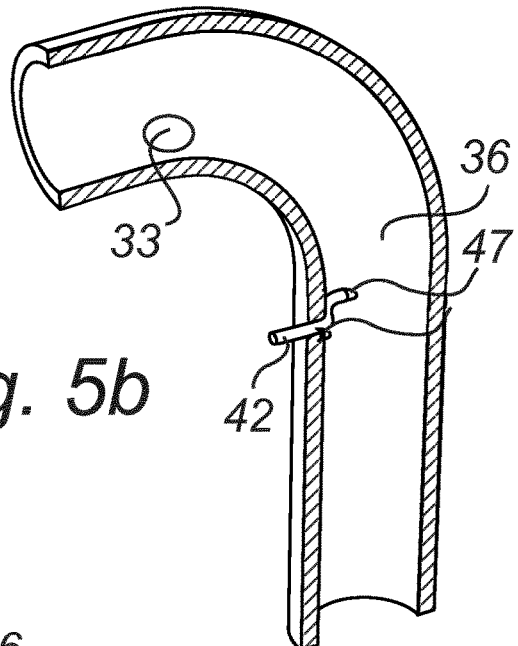

FIG. 5b shows an outlet 47 which is arranged to direct the flow of fluid at least partly tangential to an inner wall 36 of the measurement portion 35. The direction of the flow cause by the outlet 47 may obtain a helical flow of fluid in at least a part of the measurement portion 35. A helical flow may provide an improved mixture of the fluid, e.g. gas, within the measurement portion 35 and thereby reduce the occurrence of local differences in the gas composition in the measurement portion 35 and thus the waveguide 30.

Figure 5C:
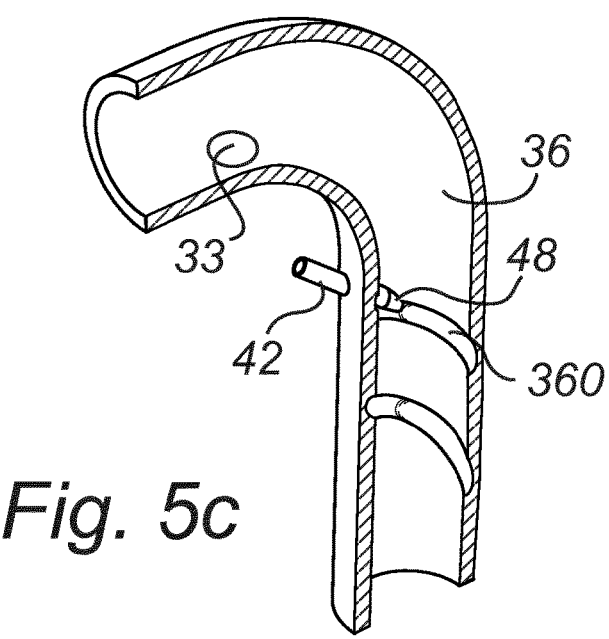

FIG. 5c shows an outlet 48 similar to the outlet in FIG. 5b, i.e. the outlet 48 is arranged to direct the flow of fluid at least partly tangential to an inner wall 36 of the measurement portion 35. In FIG. 5c however, a spiral track 360 is formed in the inner wall 36 of the measurement portion 35. The spiral track 360 allows the flow of fluid to be redirected to a helical flow, and also such that the helical flow may be obtained closer to the surface of the liquid to be measured. The spiral track 360 may extend for at least a quarter of the longitudinal extent of the measurement portion 35, or for at least half of the longitudinal extent of the measurement portion 35, or for substantially the entire longitudinal extent of the measurement portion 35.

Figure 5D:
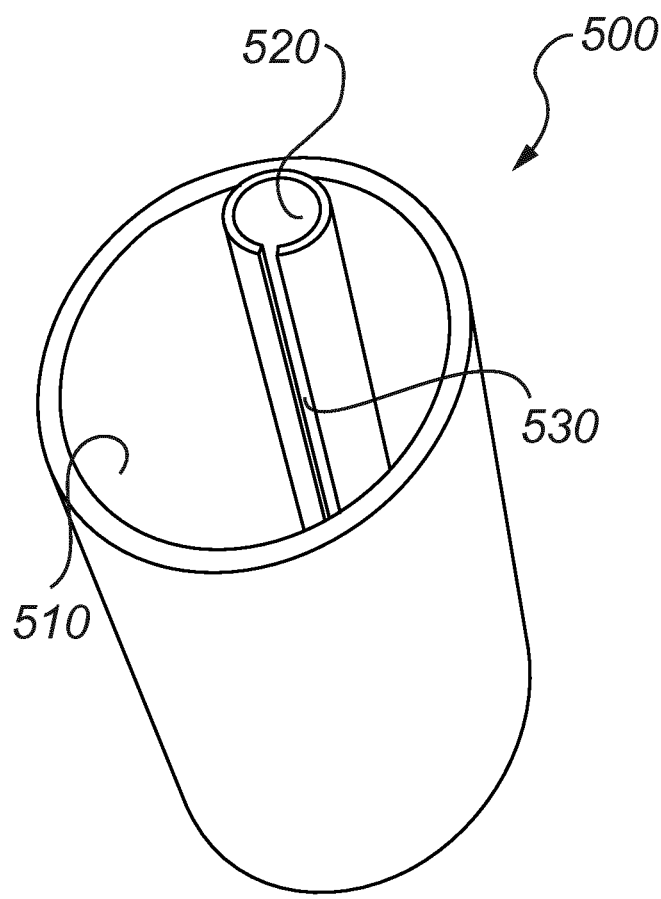

FIG. 5d shows a perspective view a measurement portion 500 according to an alternative embodiment of the invention. In FIG. 5d the measurement portion 500 of the waveguide comprises a first section 510 and a second section 520. The first section 510 is a measurement section 510 used for the acoustic measurement of the level of a liquid surface in a tank. The second section 520 is configured to receive the flow from the channel 42 and release the flow into the first section 510 via a slit 530 connecting the first and second sections 510, 520 along the longitudinal extension of the measurement portion. The slit 530 may have a width which is substantially uniform along the length of the measurement portion 35. Alternatively, the slit 530 may be tapered such that the width is larger towards the second end 32 of the waveguide.

In FIG. 5d, the second section may be formed by an inner pipe which has longitudinal slit 530. Alternatively, the second section may be formed by the waveguide such that two arced portions extend from the inner wall towards each other and form the slit in between the two arced portions.

Figure 5E:
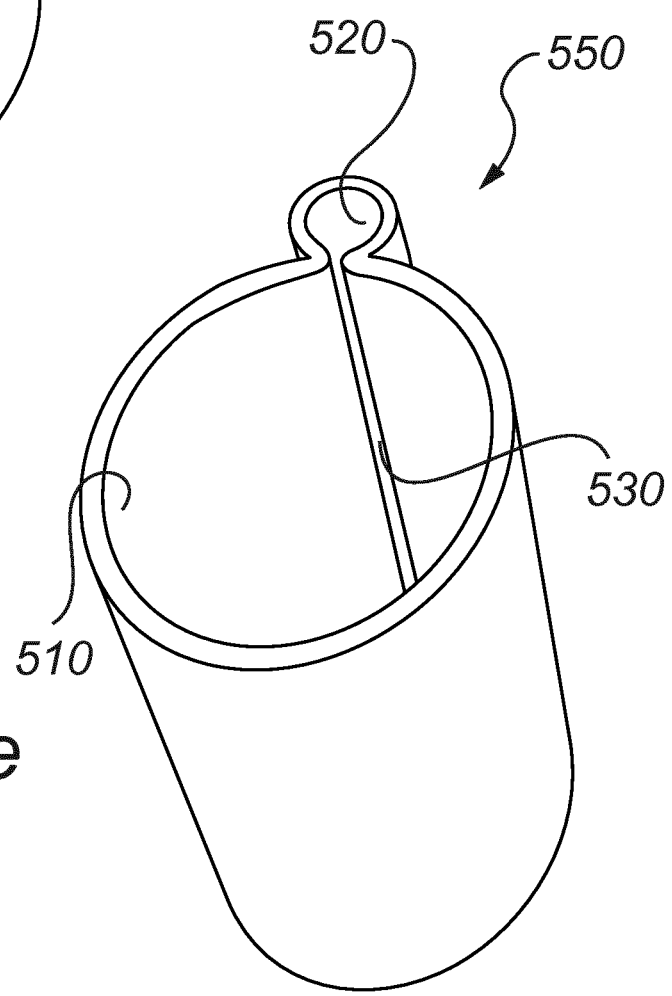

FIG. 5e shows an embodiment of a waveguide 550 similar to FIG. 5d. The difference being that the second section 520 is formed by an outer pipe configured to receive the flow from the channel 42 and release the flow into the first section 510 via a slit 530 connecting the first and second sections 510, 520 along the longitudinal extension of the measurement portion. In other words, the measurement portion may be seen as similar to the shape of the number eight as seen in a cross section perpendicular to the longitudinal extension of the measurement portion. The slit 530 may have a width which is substantially uniform along the length of the measurement portion 35. Alternatively, the slit 530 may be tapered such that the width is larger towards the second end 32 of the waveguide. The outer pipe shown is formed integral with the walls of the waveguide such that the waveguide 550 may manufactured by extrusion. Alternatively, the outer pipe, e.g. second section 520 may be formed by a separate pipe which is attached to the waveguide by suitable attachment means, e.g. welding, gluing, etc.

In an embodiment, not shown in the figures, two devices may be arranged together. Such an arrangement may for instance be suitable in a saddle tank. Alternatively, the device may only include a common transducer, but two waveguides in a way similar to the device shown in the international patent application WO 08/008019.

In at least one exemplary embodiment, not shown in the drawings, the measurement portion may be tapered such that it is wider towards the second end. The measurement portion may thus form a measurement cone with the base being the second end of the waveguide.

The person skilled in the art realizes that the present invention by no means is limited to the preferred embodiments described above. On the contrary, many modifications and variations are possible within the scope of the appended claims. For example, although acoustic pulses have been used in the described embodiments, the inventive measurement device may also be used with other measurement modes such as standing wave measurement. Also, the above embodiments and variants may be combined in several ways.

The invention claimed is:

1. A device for providing a gas composition and temperature compensated acoustic measurement of the level of a liquid surface in a tank, said device comprising:
   a transmitter adapted to transmit acoustic signals;
   a receiver adapted to receive reflections of said acoustic signals;
   a waveguide for guiding acoustic signals from said transmitter to the liquid surface and for guiding reflections of said acoustic signals back to said receiver, the waveguide comprising:
      a first end connected to the transmitter,
      a second end adapted to extend into the liquid,
      a reference element arranged in said waveguide;
      a reference portion extending from said first end to said reference element; and
      a measurement portion extending from said reference element towards said second end;
   wherein:
      a channel extending from at least one inlet in said reference portion to at least one outlet in said measurement portion, said channel being separated from the waveguide so as to provide a fluid connection between the reference portion and the measurement portion independent of the waveguide, and
   a gas-pump arranged to, during operation, create a gas flow in said channel from said at least one inlet to said at least one outlet.

2. The device according to claim 1, wherein at least part of said channel is arranged inside the waveguide.

3. A device according to claim 1, comprising a plurality of inlets arranged along a longitudinal extension of said reference portion, said plurality of inlets being connected to the at least one outlet via said channel.

4. A device according to claim 1, comprising a plurality of separate outlets spaced apart and arranged along the longitudinal extension of said measurement portion.

5. A device according to claim 4, wherein a width of said slit is configured such that the release of gas is uniform along a longitudinal extension of the measurement portion.

6. A device according to claim 4, wherein a size of each outlet is configured such that the release of gas is uniform along a longitudinal extension of the measurement portion.

7. A device according to claim 1, wherein a portion of said channel extends along said measurement portion, and said at least one outlet is an elongated slit between said channel and said measurement portion.

8. A device according to claim 1, comprising one single outlet in a lower end of said measurement portion, such that bubbles may form when the surface of the liquid is above the single outlet.

9. The device according to claim 8, wherein said channel comprises an inner pipe arranged at least partly in said measurement portion, and wherein said single outlet is formed by a lower opening of said inner pipe.

10. A device according to claim 1, wherein said at least one outlet is configured to provide a stream of gas in a downwards direction along the longitudinal extension of said measurement portion, such that when the surface is beneath said outlet, said outlet creates a jet which at least partly reaches the surface of the liquid.

11. A device according to claim 10, wherein said at least one outlet is arranged to direct said flow of fluid in a direction at least partly tangential to an inner wall of the measurement portion of said waveguide such that a helical flow is obtained in at least a part of the measurement portion.

12. A device according to claim 1, further comprising an absorbing element arranged in a retaining chamber in fluid connection with said reference portion, said absorbing element being adapted to collect liquid originating from the liquid in the tank and to release gas originating from said liquid.

13. A device according to claim 1, wherein said transmitter and said receiver are integrated into a single acoustic transducer.

14. A device according to claim 1, wherein said gas-pump is formed by said transmitter.

15. A device according to claim 14, wherein the transmitter and gas-pump include one-single piezo-electric element.

16. A device according to claim 1, wherein the transmitter is driven by a first drive frequency and the pump is driven by a second drive frequency.

17. A device according to claim 16, wherein said pump and said transmitter are connected by a single shared signal wire, wherein a frequency of a control signal on said shared signal wire determines which one of the pump and transmitter that is operable.

* * * * *